United States Patent
Chandra et al.

(10) Patent No.: US 7,353,471 B1
(45) Date of Patent: Apr. 1, 2008

(54) METHOD AND APPARATUS FOR USING FULL-CHIP THERMAL ANALYSIS OF SEMICONDUCTOR CHIP DESIGNS TO COMPUTE THERMAL CONDUCTANCE

(75) Inventors: Rajit Chandra, Cupertino, CA (US); Adi Srinivasan, Fremont, CA (US)

(73) Assignee: Gradient Design Automation Inc., Santa Clara, CA (US)

( * ) Notice: Subject to any disclaimer, the term of this patent is extended or adjusted under 35 U.S.C. 154(b) by 145 days.

(21) Appl. No.: 11/198,470

(22) Filed: Aug. 5, 2005

Related U.S. Application Data

(63) Continuation-in-part of application No. 10/979,957, filed on Nov. 3, 2004, now Pat. No. 7,194,711.

(60) Provisional application No. 60/598,987, filed on Aug. 5, 2004.

(51) Int. Cl.
*G06F 17/50* (2006.01)
(52) U.S. Cl. .............................. 716/4; 716/5
(58) Field of Classification Search ............... 716/4–6, 716/1
See application file for complete search history.

(56) References Cited

U.S. PATENT DOCUMENTS

| | | | |
|---|---|---|---|
| 4,696,578 A | 9/1987 | Mansuria et al. | |
| 5,654,904 A | 8/1997 | Thakur | |
| 6,124,635 A | 9/2000 | Kuwabara | |
| 6,320,201 B1 | 11/2001 | Corbett et al. | |
| 6,389,582 B1 | 5/2002 | Valainis et al. | |
| 6,505,326 B1 | 1/2003 | Farral et al. | |
| 6,591,399 B1 | 7/2003 | Wyrzykowska et al. | |
| 6,634,013 B2 * | 10/2003 | Shinzawa | 716/5 |
| 6,751,781 B2 * | 6/2004 | Lin et al. | 716/1 |
| 6,769,102 B2 * | 7/2004 | Frank et al. | 716/5 |
| 6,993,742 B2 | 1/2006 | Fryer et al. | |
| 7,025,280 B2 | 4/2006 | Kaushal et al. | |
| 7,039,888 B2 * | 5/2006 | Steinmann et al. | 716/5 |
| 7,191,413 B2 | 3/2007 | Chandra et al. | |
| 7,194,711 B2 | 3/2007 | Chandra | |
| 7,203,920 B2 | 4/2007 | Chandra | |

(Continued)

OTHER PUBLICATIONS

Ting et al (IEEE Transactions on computer-aided design, vol. 21. No. 12, Dec. 2002).*

(Continued)

*Primary Examiner*—Jack Chiang
*Assistant Examiner*—Binh Tat
(74) *Attorney, Agent, or Firm*—Kin-Wah Tong, Esq.; Patterson & Sheridan, LLP

(57) ABSTRACT

A method and apparatus for using full-chip thermal analysis of semiconductor chip designs to compute thermal conductivity is disclosed. One embodiment of a novel method for analyzing the conductivity of a semiconductor chip design that comprises a plurality of physical layers includes defining at least one thermal layer within the plurality of physical layers, where the thermal layer(s) represents a variance in thermal conductivity relative to a remainder of the semiconductor chip design, and computing a thermal conductivity of the thermal layer(s). As the thermal layer(s) represents variances in thermal conductivity over the semiconductor chip design, the thermal layer(s) does not necessarily correspond one-to-one to the physical layers of the semiconductor chip design. Thus, the thermal conductivities within the semiconductor chip design can be computed from the thermal layers.

16 Claims, 8 Drawing Sheets

U.S. PATENT DOCUMENTS

2005/0149886 A1 7/2005 Kaushal et al.
2005/0155004 A1 7/2005 Miura et al.
2005/0166166 A1 7/2005 Chandra et al.

OTHER PUBLICATIONS

Wang, Ting-Yuan, et al., "Thermal-ADI-A Linear-Time Chip-Level Dynamic Thermal-Simulation Algorithm Based on Alternating-Direction-Implicit (ADI) Method", IEEE Transactions on Very Large Scale Integration (VLSI) Systems, vol. 11, No. 4, dated Aug. 4, 2003, pp. 691-700.

Wang, Ting-Yuan, et al., "3D Thermal-ADI—An Efficient Chip-Level Transient Thermal Simulator", ISPD'03, Apr. 6-9, 2003, Monterey, California, USA http://www.ece.wisc.edu/~vlsi/research/ISPD2003_p005-wang.pdf, Copy consists of "8" unnumbered pages.

Wang, Ting-Yuan, et al., "3-D Thermal-ADI: A linear-Time Chip Level Transient Thermal Simulator", IEEE Transactions on Computer-Aided Design of Integrated Circuits and Systems, vol. 21, No. 12, dated Dec. 2002, pp. 1434-1445.

Wang, Ting-Yuan, et al., "Thermal-ADI: A Linear-Time Chip-Level Dynamic Thermal Simulation Algorithm Based on Alternating-Direction-Implicit (ADI) Method", ISPD'01, Apr. 1-4, 2001, Sonoma, California, USA http://www.ece.wisc.edu/~vlsi/research/ISPD2001_wang.pdf, Copy consists of "6" unnumbered pages.

International Search Report and Written Opinion for PCT/US2006/062184; copy consists of 11 unnumbered pages.

Szekely, V., et al., A thermal benchmark chip: design and applications:, Components, Packaging, and Manufacturing Technology, Part A, IEEE Transactions on vol. 21, Issue 3, Sep. 1998, pp. 399-405.

Hang, Li, et al., "Efficient thermal simulation for run-time temperature tracking and management", Computer Design: VLSI in Computers and Processors, 2005, ICCD 2005, Proceedings 2005 IEEE International Conference on Oct. 2-5, 2005, pp. 130-133.

\* cited by examiner

METHOD AND APPARATUS FOR USING FULL-CHIP THERMAL ANALYSIS OF SEMICONDUCTOR CHIP DESIGNS TO COMPUTE THERMAL CONDUCTANCE

CROSS REFERENCE TO RELATED APPLICATIONS

This application is a continuation-in-part of U.S. patent application Ser. No. 10/979,957, filed Nov. 3, 2004 now U.S. Pat. No. 7,194,711. In addition, this application claims the benefit of U.S. Provisional Patent Application Ser. No. 60/598,987, filed Aug. 5, 2004.

FIELD OF THE INVENTION

The present invention generally relates to semiconductor chip design, and more particularly relates to the thermal analysis of semiconductor chip designs.

BACKGROUND OF THE INVENTION

Semiconductor chips typically comprise the bulk of the components in an electronic system. These semiconductor chips are also often the hottest part of the electronic system, and failure of the system can often be traced back to thermal overload on the chips. As such, accurate estimation of a semiconductor chip design's thermal conductance is a critical parameter of semiconductor chip design.

FIG. 1 is a schematic diagram illustrating an exemplary semiconductor chip 100. As illustrated, the semiconductor chip 100 comprises one or more semiconductor devices 102a-102n (hereinafter collectively referred to as "semiconductor devices 102"), such as transistors, resistors, capacitors, diodes and the like deposited upon a substrate 104 and coupled via a plurality of wires or interconnects 106a-106n (hereinafter collectively referred to as "interconnects 106"). These semiconductor devices 102 and interconnects 106 share power, thereby distributing a thermal gradient over the chip 100 that may range from 100 to 180 degrees Celsius in various regions of the chip 100. Moreover, the thermal conductivity over the chip 100 varies with the different materials (e.g., metal, dielectric, etc.) contained therein.

Many methods currently exist for performing thermal analysis of semiconductor chips designs, e.g., to ensure that a chip constructed in accordance with a given design will not overheat and trigger a failure when deployed within an intended system. Such conventional methods, however, typically fail to provide a complete or an entirely accurate picture of the chip's operating thermal gradient. For example, typical thermal analysis models attempt to solve the temperature on the chip substrate, but do not solve the temperature in a full three dimensions, e.g., using industry standards design, package and heat sink data. Moreover, most typical methods do not account for the sharing of power among semiconductor devices and interconnects, which distributes the heat field within the chip, as discussed above.

In addition, most conventional methods for modeling heat conducting paths within semiconductor chip designs are quite complex, as extraction of conductance values involves computation of the different shapes and materials within the semiconductor chip design. The practicality of such methods is thus impacted not only by the accuracy of the thermal data provided thereto, but also by the computational inefficiency.

Therefore, there is a need in the art for a method and apparatus for using full-chip thermal analysis of semiconductor chip designs to compute thermal conductance.

SUMMARY OF THE INVENTION

A method and apparatus for using full-chip thermal analysis of semiconductor chip designs to compute thermal conductance is disclosed. One embodiment of a novel method for analyzing the conductance of a semiconductor chip design comprises receiving full-chip temperature data for the semiconductor chip design and defining at least one thermal layer within the semiconductor chip design in accordance with the full-chip temperature data. The thermal layer(s) represents variances in thermal conductance over the semiconductor chip design and does not necessarily correspond to the physical layers of the semiconductor chip design. Thus, the thermal conductances within the semiconductor chip design can be computed from the thermal layers.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for using full-chip thermal analysis of semiconductor chip designs to compute thermal conductivity. One embodiment of the inventive method uses knowledge of full, three-dimensional temperature values within a chip design—including power dissipation values distributed over semiconductor devices (e.g., transistors, resistors, capacitors, diodes and the like) and wire interconnects—to model the varying thermal conductivities within the chip design, thereby providing chip designers with the data necessary to produce more robust semiconductor chips.

As used herein, the term "semiconductor chip" refers to any type of semiconductor chip, which might employ analog and/or digital design techniques and which might be fabricated in a variety of fabrication methodologies including, but not limited to, complementary metal-oxide semiconductor (CMOS), bipolar complementary metal-oxide semiconductor (BiCMOS), and gallium arsenide (GaAs) methodologies. Furthermore, as used herein, the term "semiconductor device" refers to a potential active heat dissipating device in a semiconductor chip, including, but not limited to, transistors, resistors, capacitors, diodes and inductors. The terms "wire", "interconnect" or "wire interconnect" as used herein refer to any of various means of distributing electrical signals (which may be analog or digital, static or dynamic, logic signals or power/ground signals) from one place to another. "Interconnects" may be on a semiconductor chip itself, used in the packaging of the semiconductor chip, deployed between the semiconductor chip and the packaging, or used in a variety of other ways.

Figure 1:
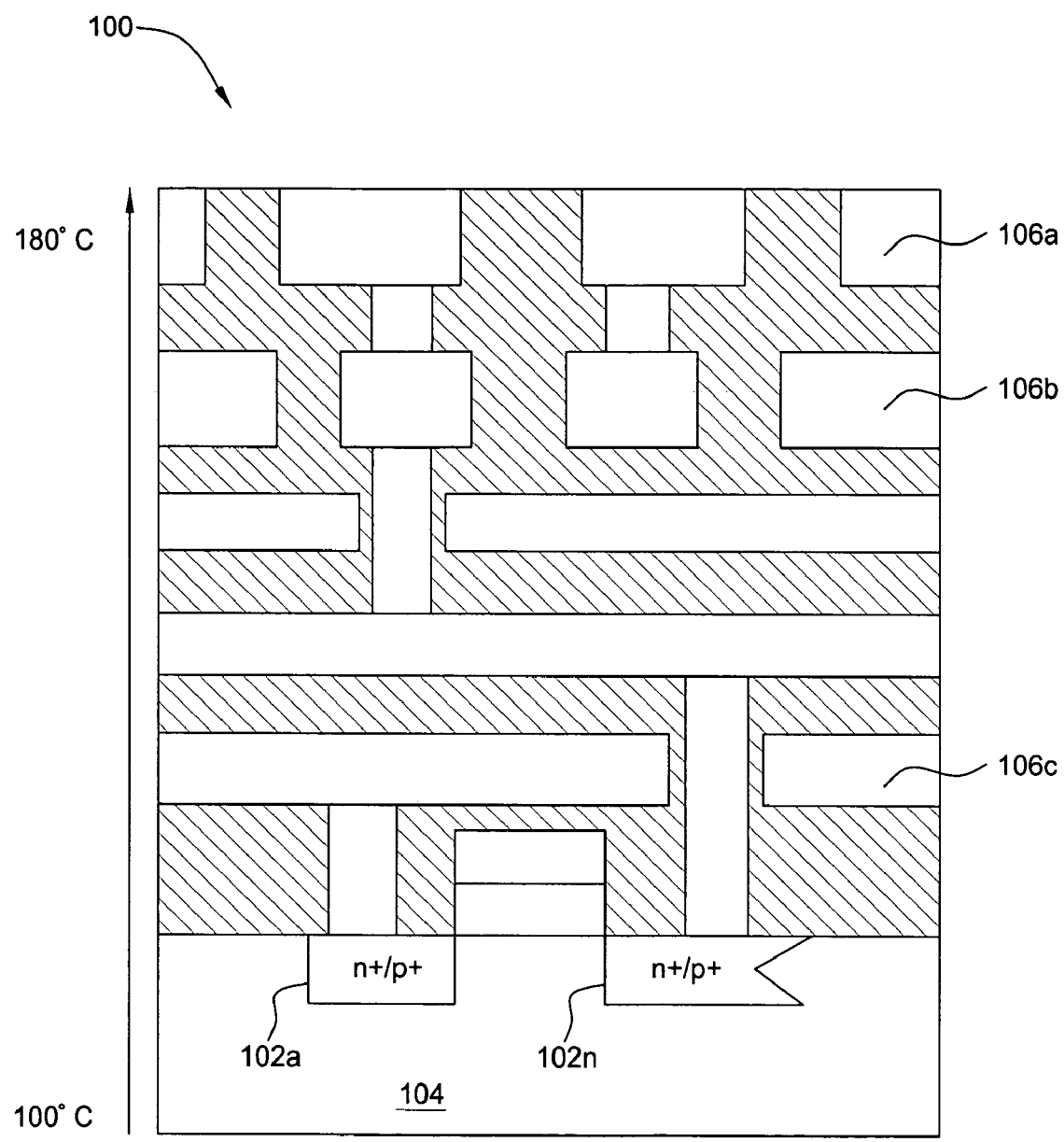
FIG. 1 is a schematic diagram illustrating an exemplary semiconductor chip.
Figure 2:
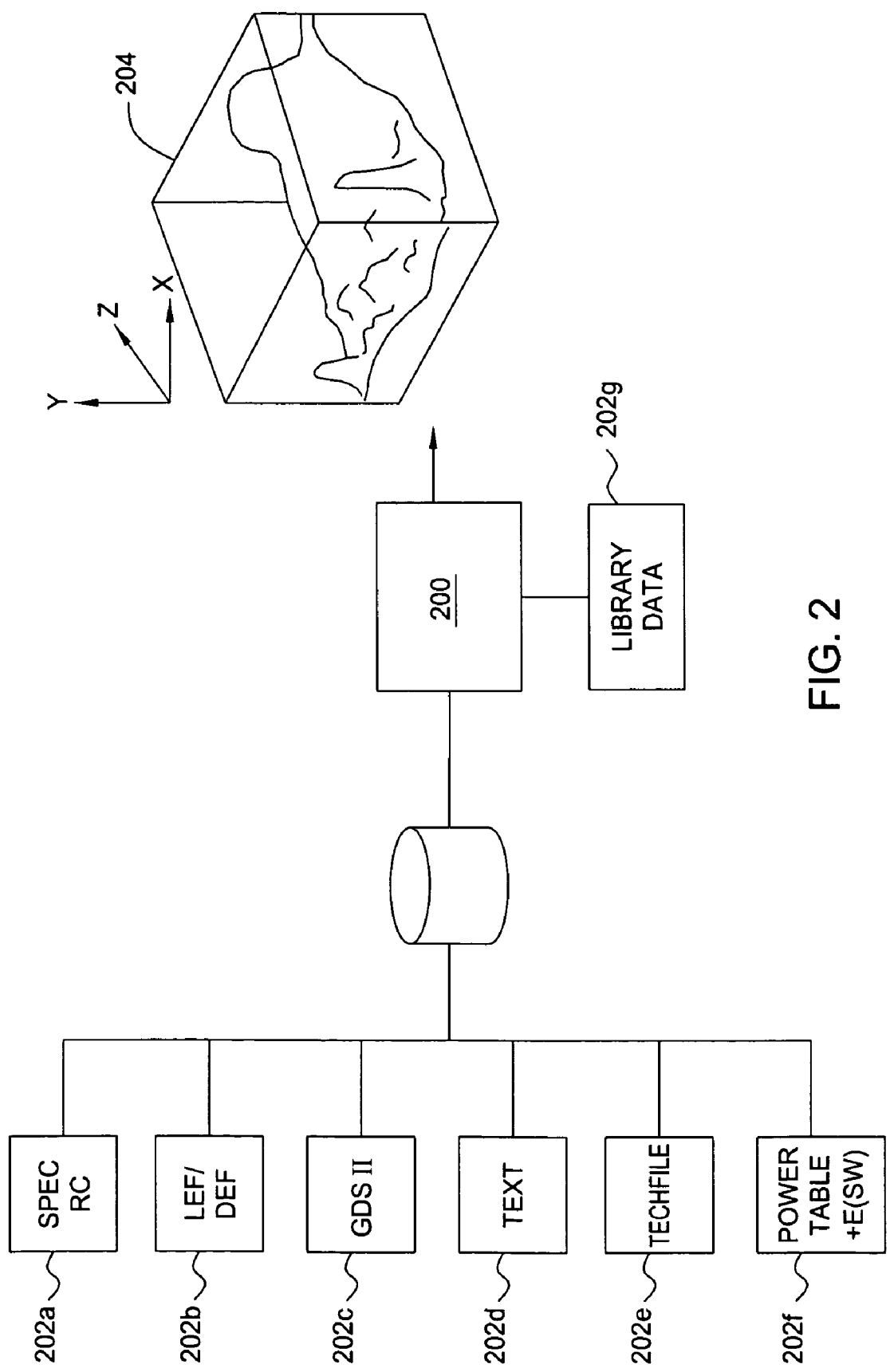
FIG. 2 is a schematic diagram illustrating one implementation of a thermal analysis tool according to the present invention.

FIG. 2 is a schematic diagram illustrating one implementation of a thermal analysis tool 200 according to the present invention. As illustrated, the thermal analysis tool 200 is adapted to receive a plurality of inputs 202a-202g (hereinafter collectively referred to as "inputs 202") and process these inputs 202 to produce a full-chip (e.g., three-dimensional) thermal model 204 of a proposed semiconductor chip design.

In one embodiment, the plurality of inputs 202 includes industry standard design data 202a-202f (e.g., pertaining to the actual chip design or layout under consideration) and library data 202g (e.g., pertaining to the semiconductor devices and interconnects incorporated in the design). In one embodiment, the industry standard design data includes one or more of the following types of data: electrical component extraction data and extracted parasitic data (e.g., embodied in standard parasitic extraction files, or SPEFs, 202a), design representations including layout data (e.g., embodied in Library Exchange Format/Design Exchange Format, or LEF/DEF files 202b, Graphical Design Format II, or GDSII, files 202c and/or text files 202d), manufacturer-specific techfiles 202e describing layer information and package models, user-generated power tables 202f including design data (e.g., including a switching factor, E(sw)). In one embodiment, this industry standard design data 202a-202f is stored in a design database such as an open access database or a proprietary database. In one embodiment, the library data 202g is embodied in a library that is distributed by a semiconductor part manufacturer or a library vendor. In another embodiment, the library incorporating the library data 202g can be built in-house by a user.

In one embodiment, the library data 202g includes transistor and diode models that are used to characterize the transistor resistances ($R_{dv}$) of the driver circuits, e.g., such as models available through Berkeley short-channel Insulated Gate Field Effect Transistor (IGFET) model (BSIM) models used by circuit simulators including Simulation Program with Integrated Circuit Emphasis (SPICE), HSPICE, commercially available from Synopsys, Inc. of Mountain View, Calif. and Heterogeneous Simulation Interoperability Mechanism (HSIM, commercially available from Nassda Corporation of Santa Clara, Calif.), all developed at the University of California at Berkeley.

As mentioned above, the plurality of inputs 202 are provided to the thermal analysis tool 200, which processes the data in order to produce a full-chip thermal model 204 of a proposed semiconductor chip design. In one embodiment, the full-chip thermal model is a three-dimensional thermal model.

Thus, as described above, embodiments of the present invention rely on library data representing the electrical properties of a semiconductor chip design (e.g., the resistance and capacitance at various points) and the manners in which these properties may vary with respect to each other and with respect to other phenomena (e.g., temperature or fabrication variations). Those skilled in the art will appreciate that these electrical properties may be specified or calculated in any number of ways, including, but not limited to, table-driven lookups, formulas based on physical dimensions, and the like.

Figure 3:
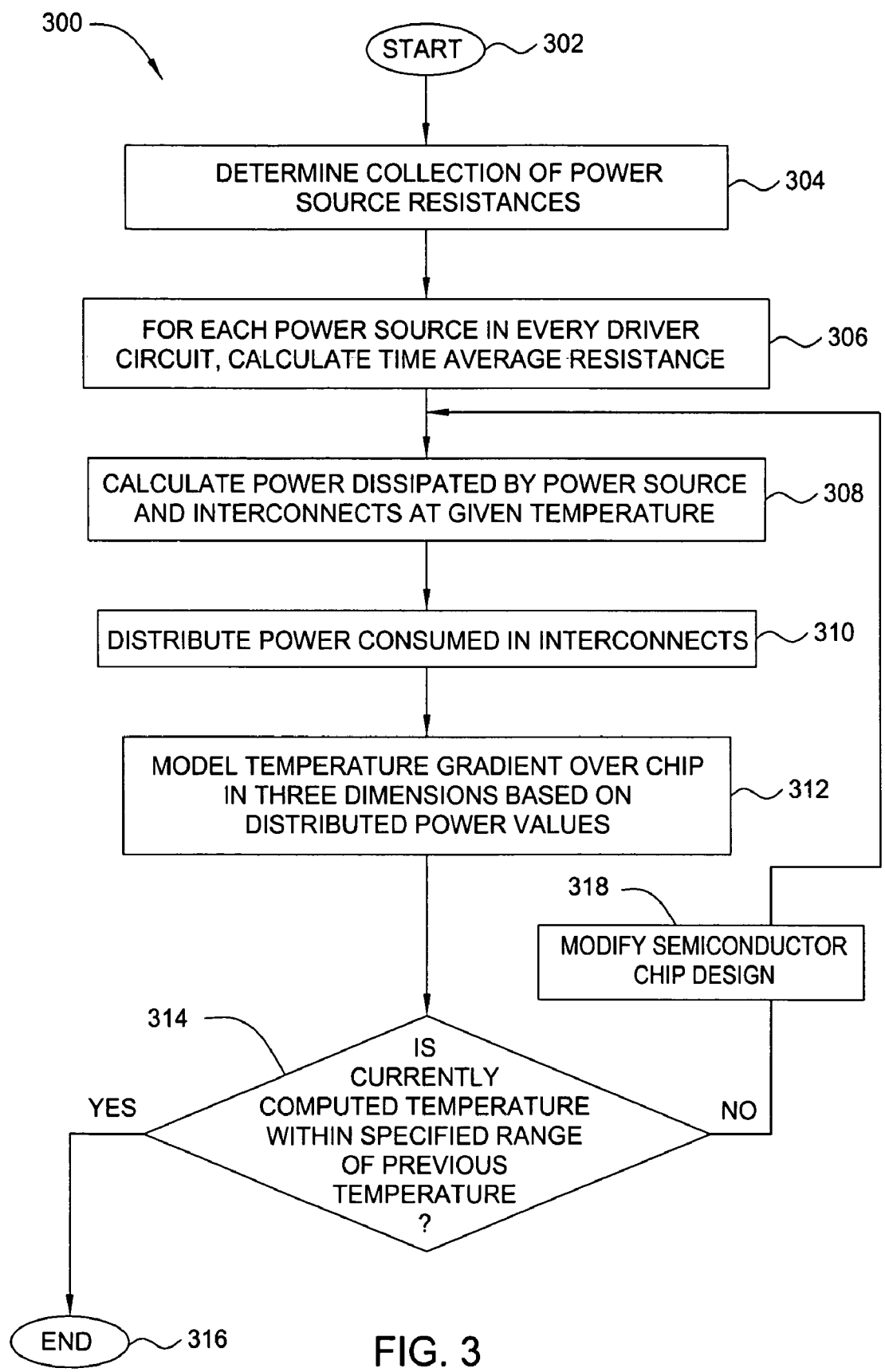
FIG. 3 is a flow diagram illustrating one embodiment of a method for performing three-dimensional thermal analysis of a semiconductor chip design according to the present invention.

FIG. 3 is a flow diagram illustrating one embodiment of a method 300 for performing full-chip thermal analysis of a semiconductor chip design according to the present invention. The method 300 may be implemented, for example, in the thermal analysis tool 200 illustrated in FIG. 2. In one embodiment, the method 300 relies on the computation of power dissipated by various semiconductor devices of the semiconductor chip design. As will be apparent from the following discussion, this power computation may be performed in any number of ways, including, but not limited to, table-driven lookups, computations based on electrical properties, circuit simulations, and the like. Moreover, those skilled in the art will appreciate that although the following description discusses the effects of resistance on power dissipation, power dissipation computations could be based on any number of other electrical properties or parameters, including, but not limited to, capacitance, inductance and the like. Moreover, the computations could be static or dynamic.

The method 300 is initialized at step 302 and proceeds to step 304, where the method 300 determines the collection of semiconductor devices (e.g., transistor, resistors, capacitors, diodes inductors and the like) and their resistances. In one embodiment, the method 300 determines this information by reading one or more of the chip layout data (e.g., in GDS II, DEF and/or text format), layer and package model data (e.g., from one or more techfiles), and initial power and power versus temperature data for the semiconductor devices (e.g., from the library data). In one embodiment, initial power values and power values as a function of temperature may be recorded within a common power table for acceptable operating ranges for the driver circuits within the chip design. The driver circuits may be at semiconductor device level or at cell level, where cell level circuits represent an abstraction of interconnected semiconductor devices making up a known function.

In step 306, the method 300 uses the information collected in step 304 to calculate the time average resistance values for every semiconductor device in every driver circuit of the chip design, as well as for every diode junction. These time-average resistance values relate to changes in semiconductor device dimensions (e.g., such as using higher power transistors in place of lower power transistors in a chip design). In one embodiment, the time average resistance value, $R_{average}$ for a semiconductor device is calculated as:

$$R_{average} = \frac{\int_0^{t_r} Rdv(t)dt}{t_r} \quad \text{(EQN. 1)}$$

where $t_r$ is the output transition time of the driver circuit under consideration, e.g., as specified by the library data.

Figure 4:
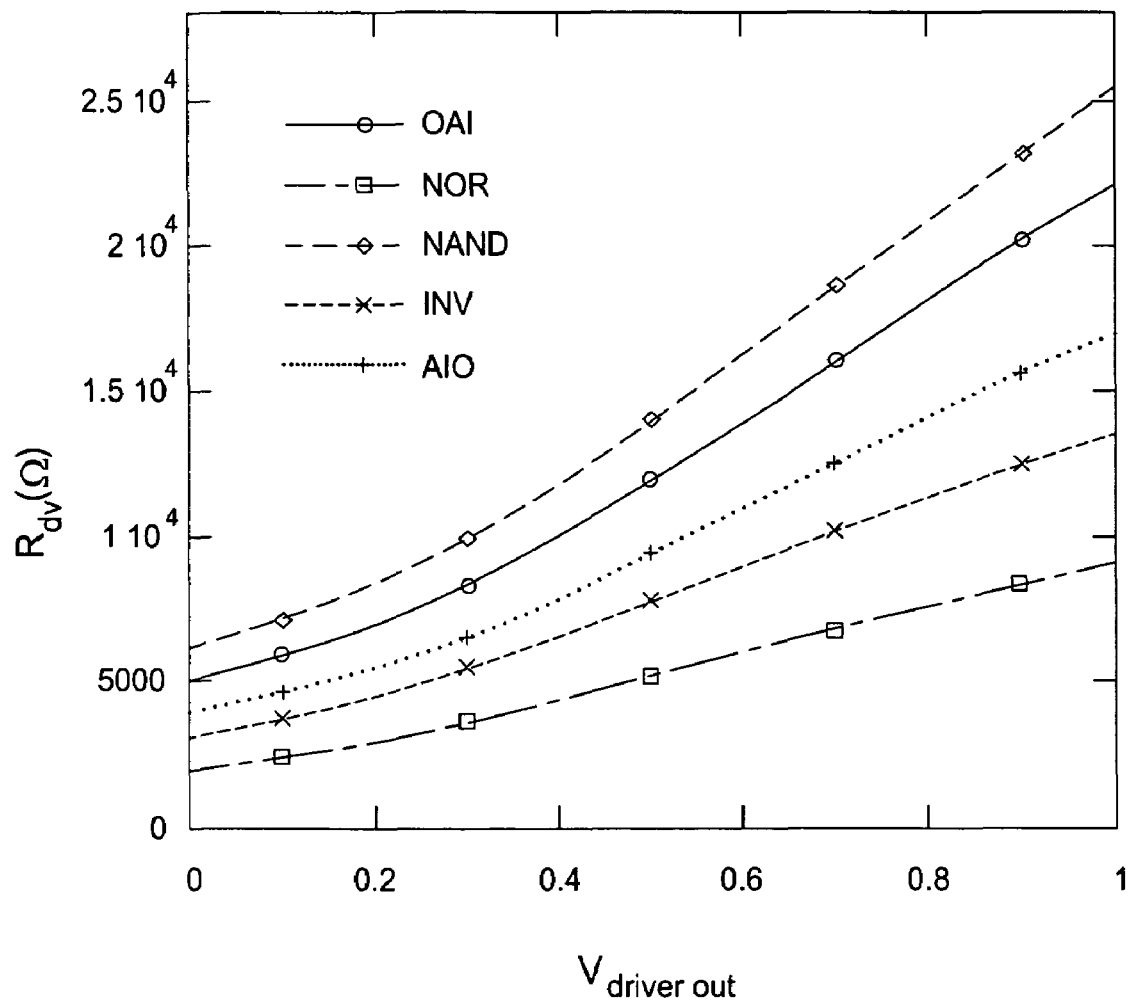
FIG. 4 is a graph illustrating the change in value of transistor resistance for an exemplary negative channel metal oxide semiconductor as a function of the output transition voltage.

FIG. 4 is a graph illustrating the change in value of transistor resistance, $R_{dv}$ for an exemplary negative channel metal oxide semiconductor (nMOS) as a function of the output transition voltage, $V_{drive\_out}$. As illustrated, the power dissipated by a transistor varies during switching. This is also true for the power dissipated in other semiconductor devices and in the interconnects coupled to the semiconductor devices on the chip.

Referring back to FIG. 3, in step 308, the method 300 calculates the power dissipated by the semiconductor devices and interconnects at a given temperature for the design under consideration. In one embodiment of step 308, e.g., where a steady-state analysis of the chip design is being performed, the interdependence of temperature and average power is captured through pre-characterized parameters of the semiconductor devices and interconnects. In one embodiment, the power dissipated by a semiconductor device (in this exemplary case, a transistor), $P_{transistor}$, is calculated as:

$$P_{transistor} = (V_d)^2 / R_{average} \tag{EQN. 2}$$

where $V_d$ is the power supply voltage supplied to the transistor. This voltage, $V_d$, is less than the actual power supply voltage, $V_{dd}$, as the current drawn by the transistors and flowing through the interconnects that connect the transistors to a power supply causes a voltage drop. In another embodiment, the power supply voltage to the transistor $V_d$ could be divided by the maximum or minimum resistance value, $R_{max}$ or $R_{min}$, in order to calculate the power dissipated in the transistor. In one embodiment, a decision as to whether to use an average, minimum or maximum resistance value to calculate $P_{transistor}$ is based at least in part on whether additional conditions, such as the operation of the circuit, are to be evaluated.

While equations for calculating the power dissipation of transistors have been provided herein by way of example, those skilled in the art will appreciate that various methods of calculating power dissipation for other semiconductor devices, such as resistors, capacitors and diodes, are known in the art. For example, equations for calculating the power dissipation of a resistor are discussed in the Proceedings of the Fourth International Symposium on Quality Electronic Design (ISQED 2003), 24-26 Mar. 2003, San Jose, Calif.

In one embodiment, the power dissipated by the interconnects (e.g., power and signal lines), $P_{interconnect}$ is calculated as:

$$P_{interconnect} = P - P_{transistor} \tag{EQN. 3}$$

where P is the average electrical power dissipated per clock cycle by a digital circuit (e.g., the chip design under consideration; for the full chip, the total P is the sum of the power dissipated by each circuit in the chip) and is available from the library data 202g. In the power lines, power is typically dissipated as Joule heating, where the dissipated power $P_{dissipated}$ may be calculated as:

$$P_{dissipated} = I_p^2 R_{power} \tag{EQN. 4}$$

where $I_p$ is the current through the power lines and $R_{power}$ is the resistance of the power bus. The value of Ip may be calculated by commercially available tools, such as Voltage Storm, available from Cadence Design Systems, Inc. of San Jose, Calif.

Typically, the power drawn by a switching transistor may be calculated as:

$$P = C_{load} V_{dd} E(sw)(fclk) \tag{EQN. 5}$$

where $C_{load}$ is the output capacitance as seen by the circuit, E(sw) is the switching activity as defined by the average number of output transitions per clock period, and fclk is the clock frequency. The switching factor or acrivity, E(sw), is used for evaluating the power table for the initial state of the design. $C_{load}$ may be calculated by parasitic extraction tools, and values for fclk and $V_{dd}$ are typically specified for a given design. In general, half of the power, P, is stored in the capacitance and the other half is dissipated in the transistors and interconnects (e.g., the power and signal lines). Those skilled in the art will appreciate that since $R_{average}$ varies with the transition time of the circuits, and as the switching activity changes for different modes of operation, E(sw) will also change, thereby changing the value of P and the distribution of the amounts of power dissipated in the transistors (e.g., see Equation 2) and interconnects. This will, in turn, change the heat fields and corresponding temperatures within the chip.

In another embodiment of step 308, a transient analysis is performed, wherein the interdependence of temperature and average power in the semiconductor devices and interconnects is based on instantaneous values of power. In this case, power dissipated values are calculated by dynamically simulating the circuit embodied in the chip design under consideration. For example, the circuit may be simulated using any commercially available circuit simulator, such as HSPICE or HSIM, discussed above, or SPECTRE, commercially available from Cadence Design Systems. In one embodiment, the circuit is simulated by solving for values of electrical attributes (e.g., current and voltages) at various points in time. In the case of transient thermal analysis, the thermal analysis system (e.g., thermal analysis tool 200 of FIG. 2) drives the circuit simulator to calculate power at discrete points whenever there is a sufficient change in the temperature of the circuit. In one embodiment, the sufficiency of a temperature change for these purposes is determined by a predefined threshold.

In step 310, the method 300 distributes the power consumed in each of the interconnects. In one embodiment, power is distributed based on the resistance of the wires used in the interconnects, which is defined by the type, thickness and height of the wires used in the interconnects. In one embodiment, the resistance, $R_{interconnect}$, of an interconnect segment is calculated as:

$$R_{interconnect} = \frac{\rho L}{wt} \tag{EQN. 6}$$

where L is the length of the interconnect segment, w is the width of the segment, t is the thickness of the segment, and p is a resistivity constant dependent upon the type of wire used. The resistivity constant, p, may be found in tables included in any number of integrated circuits textbooks, including Rabaey et al., *Digital Integrated Circuits*, Second Edition, Prentice Hall Electronic and VLSI Series, 2002.

In step 312, the method 300 uses the power dissipation and distribution information calculated in steps 306-310 to model a full-chip (e.g., three-dimensional) temperature gradient over the chip design under consideration. In one embodiment, a full-chip temperature gradient is modeled by adaptively partitioning the volumes of steep temperature gradients over the chip design. In one embodiment, partitioning is done in three dimensions; however, in other embodiments, partitioning may be done in one or two dimensions as well (for example, vertical partitioning may be explicitly considered in how the temperature is modeled). In one embodiment, "steep" temperature gradients are those portions of the overall temperature gradient that are steep relative to other regions of the overall temperature gradient. In one embodiment, techfile data (e.g., pertaining to the dimensions and properties of the chip design layers) and power density data are used to partition the chip design. Power density data is typically contained within the power table provided for a particular state of operation of a chip design. The temperatures in each partition are then determined and annotated accordingly in the three-dimensional model.

In step 314, the method 300 determines whether the currently computed temperature for the chip design falls within a previously specified range. If the method 300 concludes that the currently computed temperature does not fall within this range, the method 300 proceeds to step 318 and modifies the chip design (e.g., by changing the resistances of the semiconductor devices and interconnects, resizing the semiconductor devices and interconnect wires, etc.). The method 300 then returns to step 308 and proceeds as discussed above.

Alternatively, if the method 300 determines that the currently computed temperature does fall within the specified range, the method 300 proceeds to step 316 and terminates. Thus, steps of the method 300 may be repeated in an iterative manner until a steady state value is reached, within a specified tolerance. In one embodiment, iteration of these steps may depend on the particular implementation of the method 300. In further embodiments, iteration could include convergence to an absolute value, convergence to a relative value, or the passing of a fixed number or iterations or a fixed amount of time.

Thus, the method 300 employs industry standard design, package and heat sink data in order to produce a more complete and more accurate profile of the temperature gradient created by a semiconductor chip design. By accounting for the distribution of power dissipated in the semiconductor devices and in the interconnects, rather than simply characterizing dissipated power as the power dissipated in the active semiconductor devices (which does not consider simultaneous changes in the electrothermal properties of the semiconductor devices and interconnects), more accurate, full-chip thermal profiling can be achieved.

Chip designers may use the full-chip data produced by the method 300 to design more robust semiconductor chips for particular applications. For example, if the full-chip temperature gradient produced by one iteration of the method 300 does not illustrate acceptable results for a semiconductor chip design, a chip designer may go back and modify the chip design (e.g., by changing the resistances of the semiconductor devices and interconnects, resizing the semiconductor devices and interconnect wires, etc.) in an attempt to achieve more desirable results. The method 300 may then be applied to the modified design to assess the resultant temperature gradient. Those skilled in the art will appreciate that while the method 300 illustrates a series of steps, the present invention is not limited to the particular sequence illustrated, and thus FIG. 3 should be considered only as one exemplary embodiment of the present invention.

Full-chip temperature gradients such as those produced by the method 300 may also be useful in computing the thermal conductance of a semiconductor chip design. That is, the thermal conductance of the semiconductor chip design may be determined in a more computationally efficient manner than is possible using existing methods, by relying on the full-chip temperature data.

Figure 5:
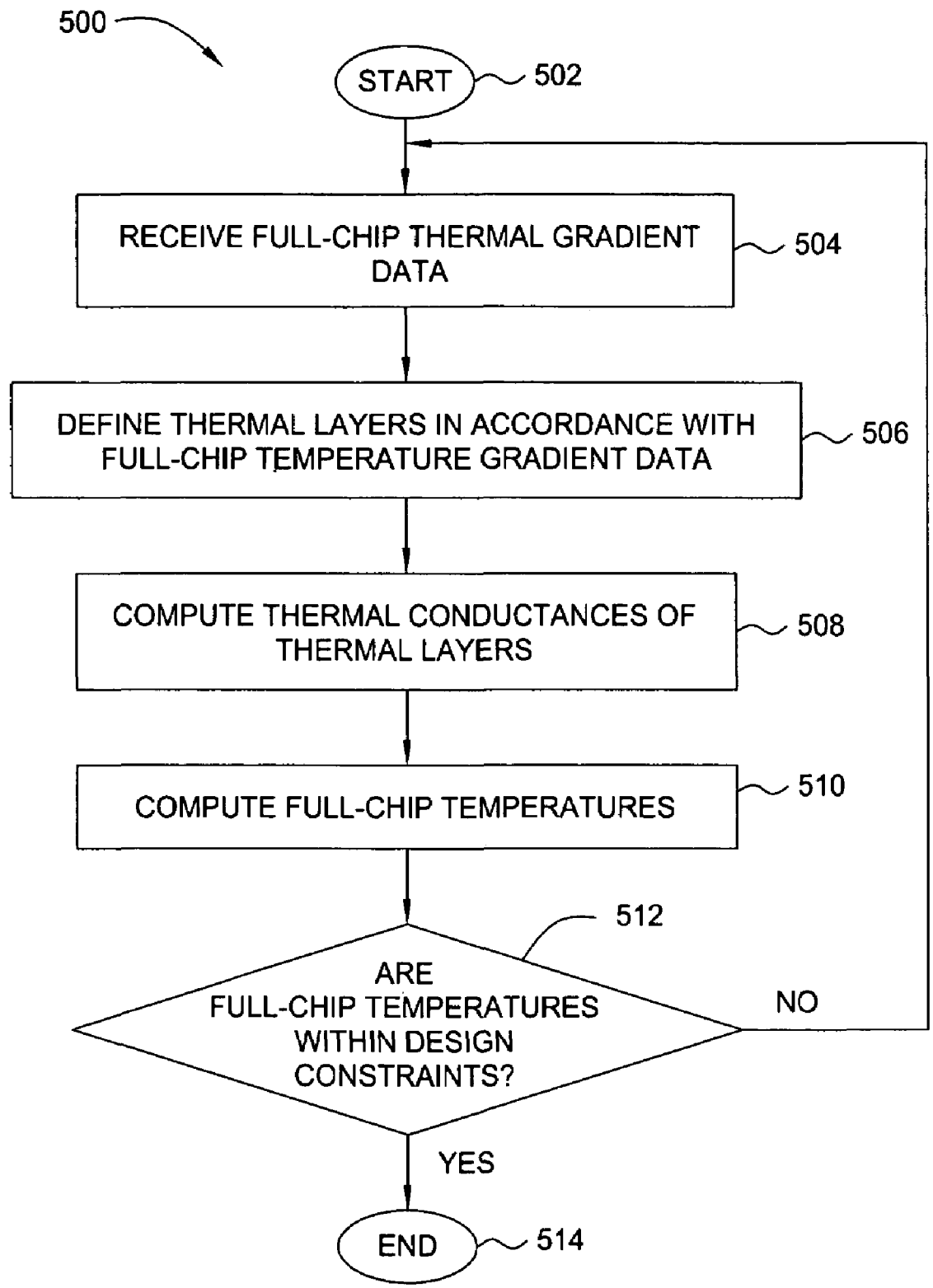
FIG. 5 is a flow diagram illustrating one embodiment of a method for computing the thermal conductance of a semiconductor chip design.

FIG. 5 is a flow diagram illustrating one embodiment of a method 500 for computing the thermal conductance of a semiconductor chip design. In one embodiment, the method 500 may be implemented in conjunction with the methods described above such that full-chip thermal analysis data is used in the computation of the thermal conductance.

The method 500 is initialized at step 502 and proceeds to step 504, where the method 500 receives full-chip thermal gradient data for the semiconductor chip design under analysis, e.g., in accordance with the method 300 described above. In one embodiment, the semiconductor chip design may comprise a single semiconductor chip or a plurality of semiconductor chips in a package (e.g., systems in a package).

In step 506, the method 500 defines one or more thermal layers in the semiconductor chip design, in accordance with the full-chip thermal gradient data. Specifically, the full-chip thermal gradient data received in step 504 aids in identifying those portions of the semiconductor chip design in which the thermal conductance is not uniform (e.g., areas near the boundary of a metal and a dielectric material). The varying thermal conductances observed over the semiconductor chip design are then modeled or defined as layers. These thermal layers may or may not correspond one-to-one to the physical layers of the semiconductor chip design, as defined by the different materials incorporated therein. In addition, the thermal layers may extend beyond the boundaries of the semiconductor chip design and into an external characteristic of the semiconductor chip design (e.g., into surrounding air, liquid coolants, etc.). Thus, heat transfer between internal and boundary objects, as well as between two or more internal objects, may be modeled in accordance with the present invention.

In one embodiment, the thermal layers are further defined in accordance with the thermal properties of the materials comprising the physical layers. In particular, the thermal layers may be defined in accordance with heat dissipation profiles within the materials, where the heat dissipation profiles provide information on heat transfer within the materials and are functions of at least one of: the physical layers' thermal conductivity, density, specific heat, thickness and cross-sectional area. In one embodiment, the heat dissipation profiles are calculated in accordance with the dissipation calculation methods discussed above with respect to FIG. 3. In addition, the thermal layers may be defined in accordance with the physical boundaries of a package incorporating the semiconductor chip design.

Figure 6:
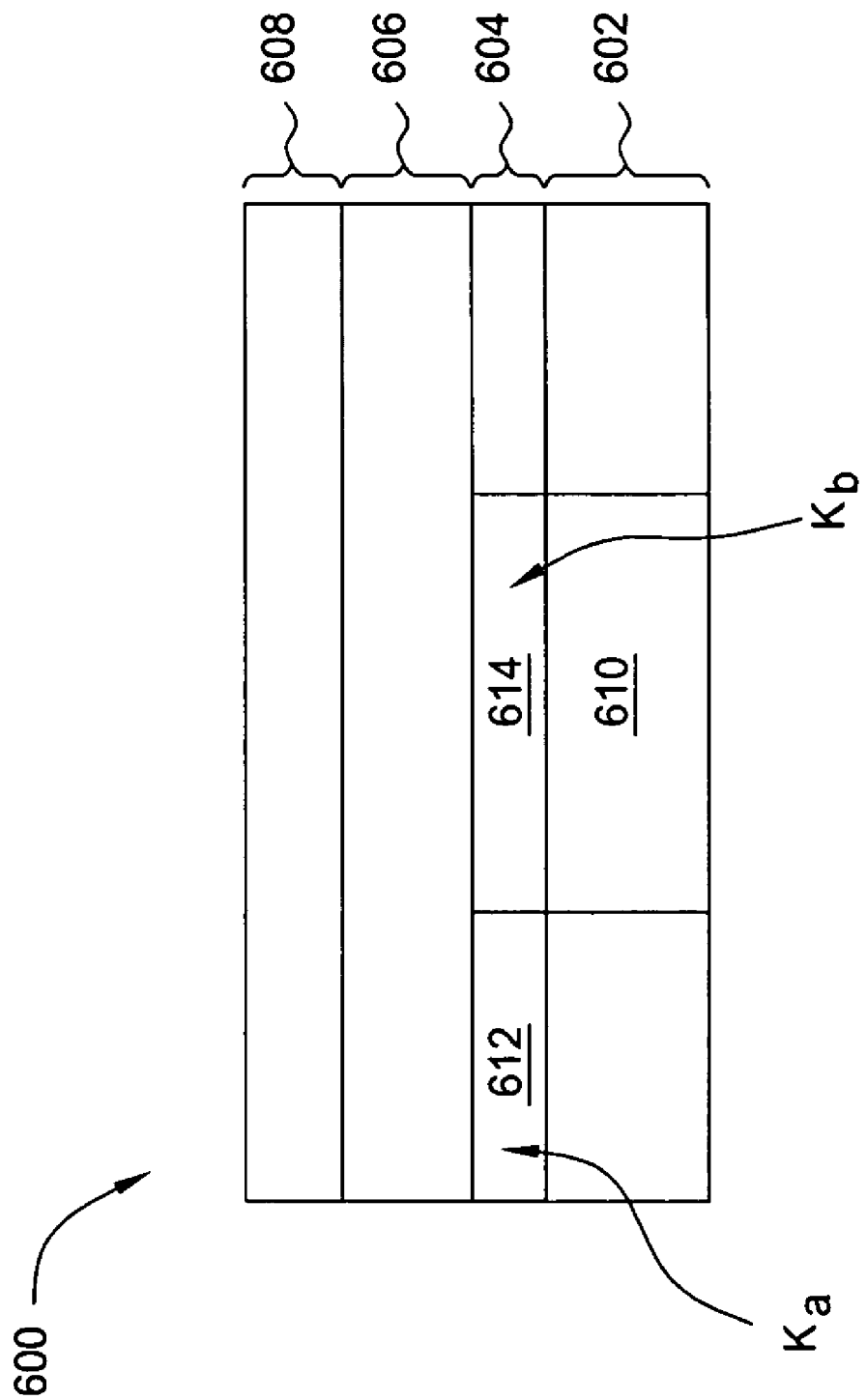
FIG. 6 is a schematic diagram illustrating one exemplary embodiment of a semiconductor chip design in which a plurality of thermal layers have been defined.

FIG. 6 is a schematic diagram illustrating one exemplary embodiment of a semiconductor chip design 600 in which a plurality of thermal layers have been defined. As discussed above, the thermal layers abstractly represent variances in thermal conductance over the semiconductor chip design and do not necessarily correspond one-to-one to physical material layers. Thus, a single physical layer may comprise a plurality of thermal layers. Conversely, a single thermal layer could encompass a plurality of physical layers (including ambient or environmental surroundings).

For instance, the semiconductor chip design 600 comprises a first metal layer 602, upon which a first dielectric layer 604, a second dielectric layer 606 and a second metal layer 608 are subsequently deposited. The first and second metal layers 602, 608 and the first and second dielectric layers 604, 606 represent the physical layers of the semiconductor chip design.

Each of the physical layers of the semiconductor chip design has a nominal thermal conductivity defined by the materials comprising the respective layers. In operation, however, the thermal conductivity of any given physical layer may vary over that physical layer due to, for example, heating effects from neighboring physical layers. For example, the first dielectric layer 604 has a first thermal conductivity of Ka when the semiconductor chip corresponding to the semiconductor chip design 600 is not in operation. However, when the semiconductor chip is in operation, a portion 610 of the first metal layer 602 generates heat that propagates into an adjacent portion of the first dielectric layer 604 such that the thermal conductivity of this adjacent portion of the first dielectric layer 604 becomes Kb. Thus, the first dielectric layer 604, which comprises only a single physical layer, may be modeled as at least two thermal layers: (1) a first thermal layer 614 positioned substantially adjacent to the portion 610 of the first metal layer 602 and having a thermal conductivity of approximately Kb; and a second thermal layer 612 comprising at least a portion of the remainder of the first dielectric layer 604 and having a thermal conductivity of approximately Ka.

In one embodiment, the thicknesses of the thermal layers (such as the first and second thermal layers 612, 614) correspond to the thermal properties of the materials comprising the corresponding physical layers. In one embodiment, the thickness of a given thermal layer is defined as the thickness of the physical layer at which the heat therewithin falls to a predefined amount or within a predefined range that is taken to be representative of heat transfer within the physical layer. In one embodiment, this representative amount or range is a percentage of the heat at a physical boundary of the thermal layer (e.g., an interface with a metal layer). This amount, range or percentage may depend, for example, on the material(s) comprising the thermal layer or on the current temperature(s) of the material(s) comprising the thermal layer (as temperature may alter conductivity). For example, in one embodiment, where the physical layers are the chip substrate and the channel layer in which transistors conduct electrical currents, the thickness of a thermal layer is the thickness at which the heat in the corresponding physical layer falls to approximately thirty-seven percent of its value at the physical boundary of the corresponding physical layer and its adjacent physical layer. Thus, thermal layers may be defined based on the material properties and shapes comprising the semiconductor chip design.

Referring back to FIG. 5, once the thermal layers have been defined within the semiconductor chip design, the method 500 proceeds to step 508 and computes the thermal conductances of the thermal layers. In one embodiment, the thermal conductance of a thermal layer is derived from the topology, geometrical dimensions and thermal conductivity of the material(s) comprising the thermal layer such that the thermal conductance for a cuboid thermal layer is kA/L, where k is the thermal conductivity of the material comprising the thermal layer, A is the cross-sectional area of the thermal layer and L is the length of the cube. This relation can be generalized for non-cuboid shaped thermal layers, where the thermal conductance of the thermal layer is kS and S is a shape factor dependent on the shape of the thermal layer.

Once the thermal conductances are computed for the thermal layers in the semiconductor chip design, the method 500 proceeds to step 510 and computes the full-chip temperatures, e.g., in accordance with the method 300.

In step 512, the method 500 determines whether the newly computed full-chip temperatures are within the design constraints of the semiconductor chip design. If the newly computed full-chip temperatures are not within the design constraints, the method 500 returns to step 504 and proceeds as described above in order to modify the semiconductor chip design.

Alternatively, if the newly computed full-chip temperatures are within the design constraints, the method 500 terminates in step 514.

By modeling the thermal conductances within the semiconductor chip design as thermal layers that do not necessarily correspond to physical chip layers, the variances in thermal conductance over the chip design can be efficiently identified for further analysis. This significantly reduces the computational complexity typically involved in computing thermal conductances for semiconductor chip designs. Moreover, by incorporating the full-chip temperature data, more accurate definition of thermal layers is attainable. In further embodiments, the method 500 may be extended to model the thermal conductivities of multiple semiconductor chips (e.g., arranged in a stack) or a package comprising one or more semiconductor chips (e.g., where conducting paths between the semiconductor chips could be modeled as stacked thermal layers).

Knowledge of the thermal conductances, obtained through application of the method 500, may be applied to iterative refinements of the method 300, e.g., to more accurately and fully model full-chip temperatures as more knowledge of the chip design's thermal properties is obtained. Moreover, the use of thermal layers enables macro-modeling of various thermal characteristics of a semiconductor chip design, including thermal resistance (e.g., where thermal resistance is the inverse of thermal conductance) and capacitance.

Figure 7:
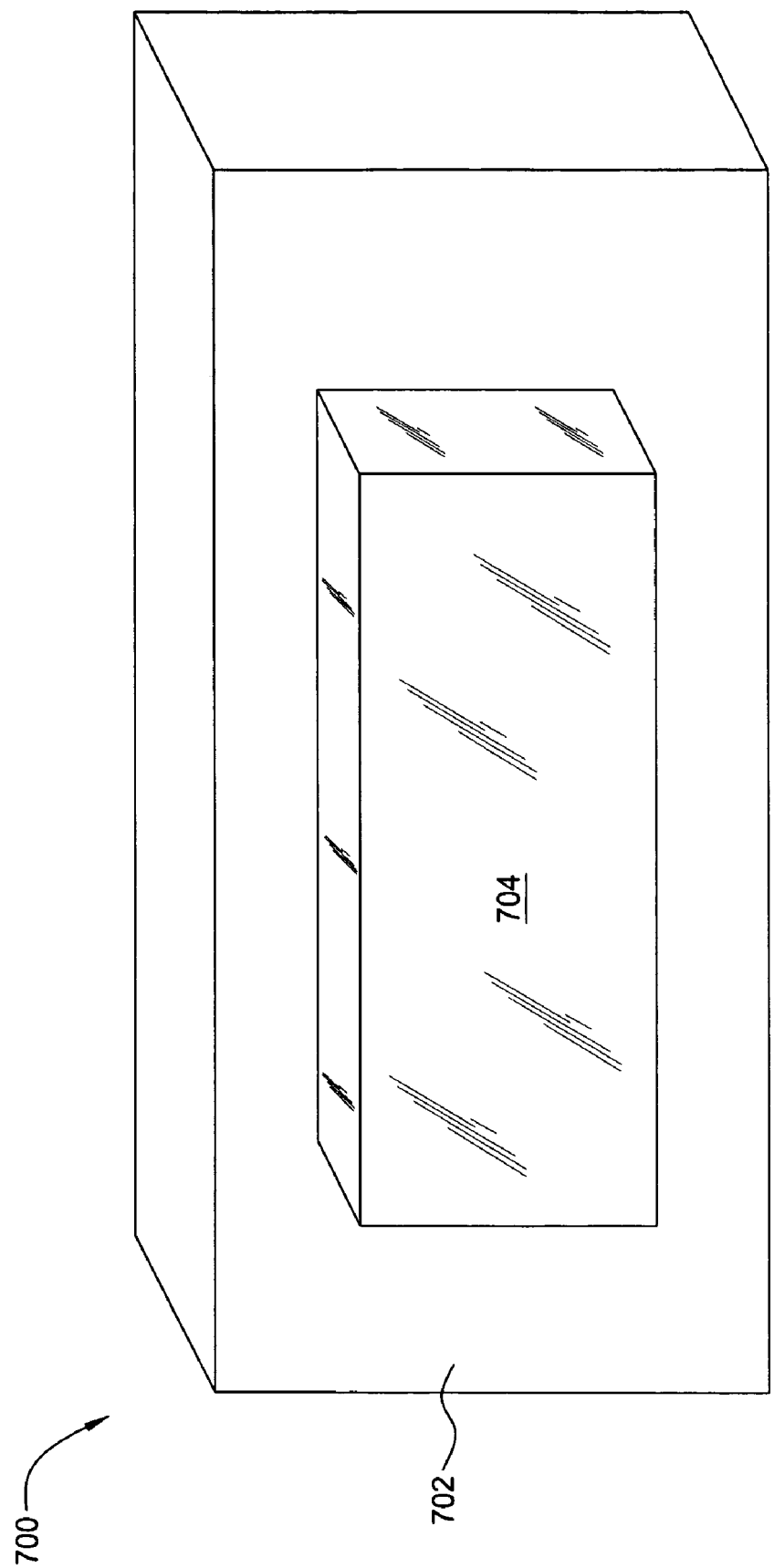
FIG. 7 is a schematic diagram illustrating a model of a semiconductor chip package, modeled in accordance with the thermal layers as described above.

FIG. 7 is a schematic diagram illustrating a model of a semiconductor chip package 800, modeled in accordance thermal layers as described above. In particular, a semiconductor chip 802 within the package 800 is modeled such that the semiconductor chip 802 comprises a first thermal layer having a first thermal conductivity and the remainder of the package 800 comprises a second thermal layer having a second thermal conductivity. In this manner, the varying thermal conductivities between the semiconductor chip 802 and the remainder of the package 800 can be easily modeled.

Figure 8:
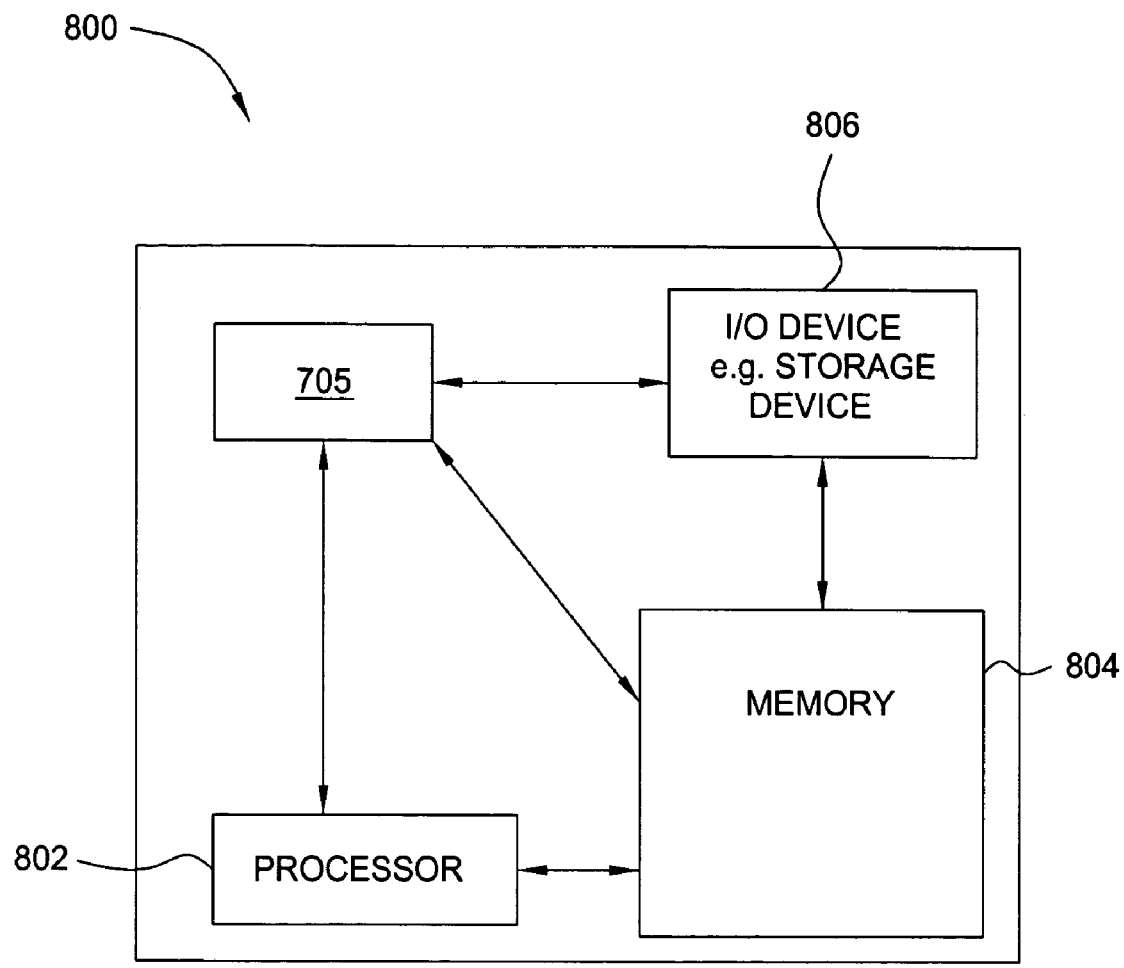
FIG. 8 is a high level block diagram of the present dynamic thermal analysis tool that is implemented using a general purpose computing device.

FIG. 8 is a high level block diagram of the present dynamic thermal analysis method that is implemented using a general purpose computing device 800. In one embodiment, a general purpose computing device 800 comprises a processor 802, a memory 804, a thermal analysis module 805 and various input/output (I/O) devices 806 such as a display, a keyboard, a mouse, a modem, a network connection and the like. In one embodiment, at least one I/O device is a storage device (e.g., a disk drive, an optical disk drive, a floppy disk drive). It should be understood that the thermal analysis module 805 can be implemented as a physical device or subsystem that is coupled to a processor through a communication channel.

Alternatively, the thermal analysis module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Additionally, the software may run in a distributed or partitioned fashion on two or more computing devices similar to the general purpose computing device 800. Thus, in one embodiment, the thermal analysis module 805 for computing thermal conductivities within semiconductor chip designs described herein with reference to the preceding figures can be stored on a computer readable medium or carrier (e.g., RAM, magnetic or optical drive or diskette, and the like).

Thus, the present invention represents a significant advancement in the field of semiconductor chip design. One embodiment of the invention provides an inventive method for computing thermal conductivities in semiconductor chip designs by modeling the varying thermal conductivities as thermal layers (that do not necessarily correspond to physical chip layers), thereby efficiently identifying the variances in thermal conductivity over the semiconductor chip design. By using full-chip thermal data to define the thermal layers, even more accurate results can be obtained, thereby providing chip designers with the data necessary to produce more robust semiconductor chips.

While the foregoing is directed to embodiments of the invention, other and further embodiments of the invention may be devised without departing from the basic scope thereof, and the scope thereof is determined by the claims that follow.

What is claimed is:

1. A method for analyzing the thermal conductance of a semiconductor chip design comprising a plurality of physical layers, the method comprising:

performing full-chip thermal analysis of said semiconductor chip design, the full-chip thermal analysis producing full-chip temperature data;

defining at least one thermal layer within said plurality of physical layers, in accordance with said full-chip temperature data, said at least one thermal layer representing a variance in thermal conductance relative to a remainder of said semiconductor chip design;

computing a thermal conductance of said at least one thermal layer; and iterating said performing, said defining, and said computing such that said iterating refines said full-chip temperature data, wherein said at least one thermal layer is defined in accordance with at least one thermal property of at least one corresponding physical layer, said at least one thermal property comprising at least one of: a thermal conductivity of a material forming said at least one corresponding physical layer, a density of a material forming said at least one corresponding physical layer, a specific heat of a material forming said at least one corresponding physical layer, a thickness of a material forming said at least one corresponding physical layer, a cross-sectional area of a material forming said at least one corresponding physical layer and physical boundaries of a package incorporating said semiconductor chip design.

2. The method of claim 1, wherein said at least one thermal layer corresponds to at least one of: at least a portion of at least one of said plurality of physical layers and an external characteristic of said semiconductor chip design.

3. The method of claim 1, wherein a thickness of said at least one thermal layers corresponds to a thickness of a corresponding physical layer at which heat propagating therewithin falls to an amount that is representative of heat transfer within said corresponding physical layer.

4. The method of claim 3, wherein said amount is thirty-seven percent of heat propagating at a boundary of said corresponding physical layer and an adjacent physical layer.

5. The method of claim 1, wherein said semiconductor chip design represents a plurality of semiconductor chips arranged in a package.

6. The method of claim 5, wherein said at least one thermal layer corresponds to at least one conducting path between at least two of said plurality of semiconductor chips.

7. The method of claim 1, further comprising:

determining full-chip thermal gradient data, in accordance with said full-chip temperature data.

8. A computer readable medium containing an executable program for analyzing the thermal conductance of a semiconductor chip design comprising a plurality of physical layers, where the program performs the steps of performing full-chip thermal analysis of said semiconductor chip design, the full-chip thermal analysis producing full-chip temperature data;

defining at least one thermal layer within said plurality of physical layers, in accordance with said full-chip temperature data, said at least one thermal layer representing a variance in thermal conductance relative to a remainder of said semiconductor chip design;

computing a thermal conductance of said at least one thermal layer; and iterating said performing, said defining, and said computing such that said iterating refines said full-chip temperature data, wherein said at least one thermal layer is defined in accordance with at least one thermal property of at least one corresponding physical layer, said at least one thermal property comprising at least one of: a thermal conductivity of a material forming said at least one corresponding physical layer, a density of a material forming said at least one corresponding physical layer, a specific heat of a material forming said at least one corresponding physical layer, a thickness of a material forming said at least one corresponding physical layer, a cross-sectional area of a material forming said at least one corresponding physical layer and physical boundaries of a package incorporating said semiconductor chip design.

9. The computer readable medium of claim 8, wherein said at least one thermal layer corresponds to at least one of: at least a portion of at least one of said plurality of physical layers and an external characteristic of said semiconductor chip design.

10. The computer readable medium of claim 8, wherein a thickness of said at least one thermal layers corresponds to a thickness of a corresponding physical layer at which heat propagating therewithin falls to an amount that is representative of heat transfer within said corresponding physical layer.

11. The computer readable medium of claim 10, wherein said amount is thirty-seven percent of heat propagating at a boundary of said corresponding physical layer and an adjacent physical layer.

12. The computer readable medium of claim 8, wherein said semiconductor chip design represents a plurality of semiconductor chips arranged in a package.

13. The computer readable medium of claim 12, wherein said at least one thermal layer corresponds to at least one conducting path between at least two of said plurality of semiconductor chips.

14. Apparatus for analyzing the thermal conductance of a semiconductor chip design comprising a plurality of physical layers, the apparatus comprising:

means for performing full-chip thermal analysis of sail semiconductor chip design, said means for performing full-chip thermal analysis producing full-chip temperature data;

means for defining at least one thermal layer within said plurality of physical layers, in accordance with said full-chip temperature data, said at least one thermal layer representing a variance in thermal conductance relative to a remainder of said semiconductor chip design;

means for computing a thermal conductance of said at least one thermal layer; and means for iterating said means for performing, said means for defining, and said means for computing such that said means for iterating refines said full-chip temperature data, wherein said at least one thermal layer is defined in accordance with at least one thermal property of at least one corresponding physical layer, said at least one thermal property comprising at least one of: a thermal conductivity of a material forming said at least one corresponding physical layer, a density of a material forming said at least one corresponding physical layer, a specific heat of a material forming said at least one corresponding physical layer, a thickness of a material forming said at least one corresponding physical layer, a cross-sectional area of a material forming said at least one corresponding physical layer and physical boundaries of a package incorporating said semiconductor chip design.

15. The apparatus of claim 14, wherein said semiconductor chip design represents a plurality of semiconductor chips arranged in a package.

16. The method of claim 7, wherein said defining is based, at least in part, on said full-chip thermal gradient data.

* * * * *